Dec. 18, 1956  G. DIEFENBACH  2,774,478
CENTRIFUGAL OLIVE WASHER AND SEPARATOR
Filed Feb. 21, 1955
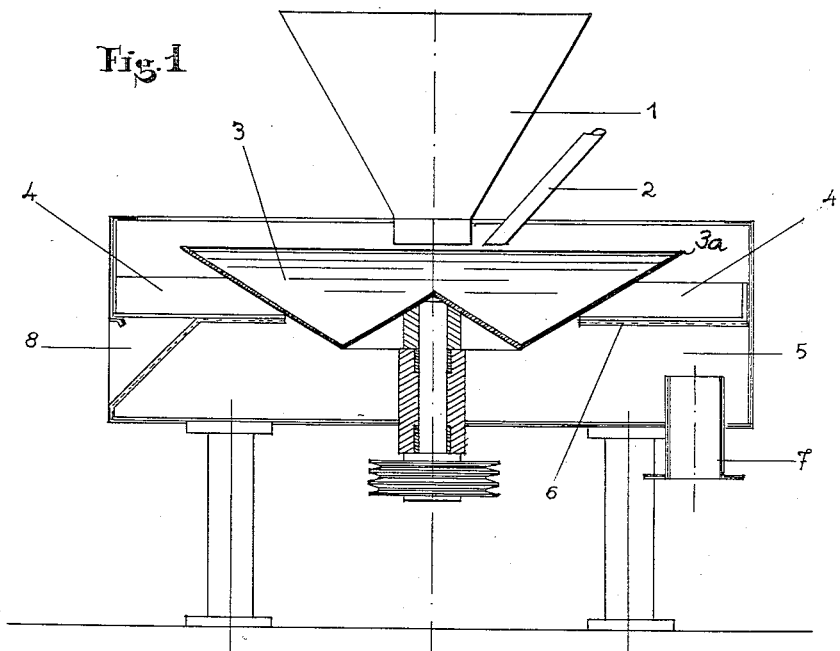
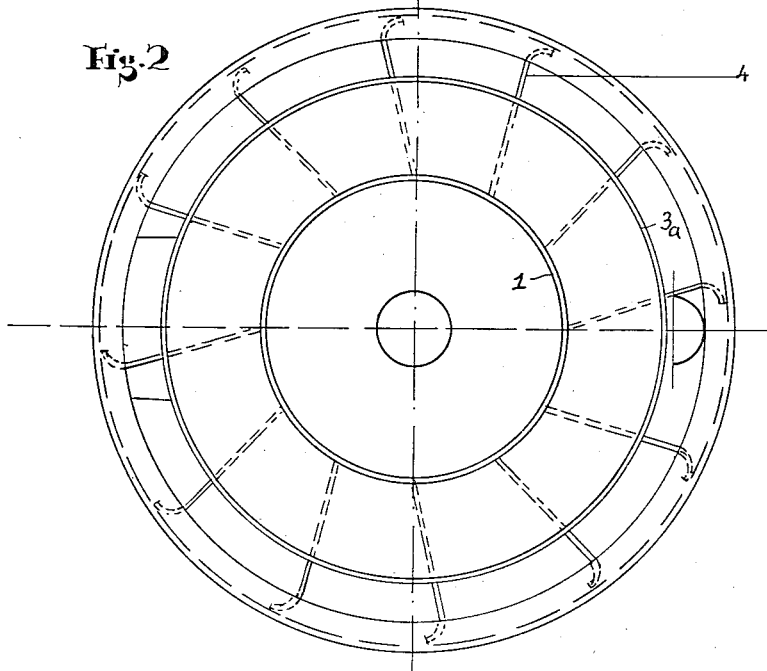
INVENTOR.
GIORGIO DIEFENBACH
BY

United States Patent Office 2,774,478
Patented Dec. 18, 1956

2,774,478

CENTRIFUGAL OLIVE WASHER AND SEPARATOR

Giorgio Diefenbach, Monza, Italy

Application February 21, 1955, Serial No. 489,510

Claims priority, application Italy February 22, 1954

3 Claims. (Cl. 209—453)

The present invention relates to a centrifugal washer for olives and other fruits, for washing and separating same from foreign matter such as wood, stones, gravel, iron, leaves and twigs and the like. It is one of the primary objects of the invention to provide means facilitating the construction of a speedy and highly efficient cleaning apparatus for fruits and the like and their separation from undesired substances clinging thereto.

A further object of the invention resides in the provision of means ensuring a continuous cleaning operation of the fruits, in particular olives, by the novel apparatus.

These and other objects of the invention will become further apparent from the following detailed description, reference being made to the accompanying drawing, showing a preferred embodiment of the invention. Fig. 1 is a cross-section of the washer made according to the invention and Fig. 2 is a plan view thereof.

As will be seen in the drawing, the washer according to the invention comprises a hopper 1, into which the olives to be treated are introduced, a pipe 2 is disposed adjacent the hopper 1 for feeding water, while the olives are falling into the specially shaped basin 3 provided below the hopper 1; said basin may carry vanes 4 applied to the outside thereof, and rotates in a cylindrical casing 5. By centrifugal action, and if needed with the aid of rods provided inside, the water and olives are thrown beyond the rim 3a of the basin and fall onto the ring-shaped perforated metal sheet 6 internally fixed to said cylindrical casing 5. While the water filters through the perforated sheet 6 and discharges through outlet 7, the olives are pushed by the vanes 4 and discharge from the outlet 8. The heavy material sinks to and remains as a deposit on the bottom of the basin 3, while the light-weight materials collect on the surface of the water-filled basin. It can thus be seen that there has been provided according to the invention a centrifugal washer for olives and other fruits, comprising a rotary basin, means for supplying said olives into said basin, means feeding water into the latter, a casing enclosing said basin from the side and bottom in spaced relationship, a perforated metal sheet supported in said casing and dividing the space between said basin and said casing in a substantially horizontal plane, means for rotating said basin, an outlet in the bottom of said casing below said perforated sheet for discharging said water, an outlet in the sidewall of said casing for discharging said olives above said perforated sheet, the bottom of said basin being substantially in the shape of an upwardly directed cone having its apex substantially at the center of the basin, the side walls of the basin being substantially frustro-conical and flaring outwardly beyond and above said upwardly directed cone.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A centrifugal washer for olives and other fruits, comprising a rotary basin, means for supplying said fruits into said basin, means for feeding water thereinto, a casing enclosing said basin from the side and bottom in spaced relationship, a perforated metal sheet dividing the space between said basin and said casing in a substantially horizontal plane, means for rotating said basin, an outlet in the bottom of said casing below said perforated sheet for discharging said water, an outlet in the sidewall of said casing for discharging said fruits above said perforated sheet, said basin being shaped to facilitate deposits of heavy foreign matter onto the bottom of said basin by gravity and carrying substantially radial arms to push said fruits towards said outlet above said sheet.

2. A centrifugal washer for olives and other fruits, comprising a rotary basin, means for supplying said olives into said basin, means feeding water into the latter, a casing enclosing said basin from the side and bottom in spaced relationship, a perforated metal sheet supported in said casing and dividing the space between said basin and said casing in a substantially horizontal plane, means for rotating said basin, an outlet in the bottom of said casing below said perforated sheet for discharging said water, an outlet in the sidewall of said casing for discharging said olives above said perforated sheet, the bottom of the said basin being substantially in the shape of an upwardly directed cone having its apex substantially at the center of the basin, the side walls of the basin being substantially frusto-conical and flaring outwardly beyond and above said upwardly directed cone.

3. A centrifugal washer for olives and other fruits, comprising a rotary basin, means for supplying olives or other fruits into said basin, means for feeding water thereinto, a casing enclosing said basin from the side and bottom in spaced relationship, a perforated metal sheet within said casing and dividing the space between said basin and said casing in a substantially horizontal plane, means for rotating said basin, a first outlet in the bottom of said casing below said perforated sheet for discharging said water, a second outlet in the sidewall of said casing for discharging said olives or fruits above said perforated sheet, said perforated sheet forming a pocket with slanting walls in front of said second outlet, said second outlet being provided in the lower portion of said side wall of said casing.

References Cited in the file of this patent

UNITED STATES PATENTS

| | | |
|---|---|---|
| 343,649 | Rippin | June 15, 1886 |
| 715,947 | Bergh | Dec. 16, 1902 |